(12) United States Patent
Schroers et al.

(10) Patent No.: US 12,288,281 B2
(45) Date of Patent: Apr. 29, 2025

(54) FRAME INTERPOLATION FOR RENDERED CONTENT

(71) Applicant: DISNEY ENTERPRISES, INC., Burbank, CA (US)

(72) Inventors: Christopher Richard Schroers, Zurich (CH); Karlis Martins Briedis, Zurich (CH); Abdelaziz Djelouah, Zurich (CH); Ian McGonigal, London (GB); Mark Meyer, Davis, CA (US); Marios Papas, Zurich (CH); Markus Plack, Nordrhein-Westfalen (DE)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/325,026

(22) Filed: May 19, 2021

(65) Prior Publication Data

US 2022/0383573 A1    Dec. 1, 2022

(51) Int. Cl.
*G06T 13/00* (2011.01)
*G06T 3/18* (2024.01)
*G06T 7/246* (2017.01)

(52) U.S. Cl.
CPC .............. *G06T 13/00* (2013.01); *G06T 3/18* (2024.01); *G06T 7/248* (2017.01); *G06T 2207/10016* (2013.01); *G06T 2207/20081* (2013.01); *G06T 2207/20084* (2013.01); *G06T 2207/20221* (2013.01)

(58) Field of Classification Search
CPC ...... G06N 3/0454; G06N 3/0472; G06N 3/08; G06T 2207/10016; G06T 2207/20084; G06T 7/246; G06V 10/462; G06V 20/584; G06V 2201/07
See application file for complete search history.

(56) References Cited

U.S. PATENT DOCUMENTS 10,521,086 B1 * 12/2019 Tiwary ........... H04N 21/234381
10,522,134 B1 * 12/2019 Matsoukas .............. G10L 15/30
(Continued)

OTHER PUBLICATIONS

"Kronos", Nuke 13.0v4 docs: Reference Guide > 2D Nodes > Time Nodes > Kronos, https://learn.foundry.com/nuke/content/reference_guide/time_nodes/kronos.html, 7 pages.
(Continued)

*Primary Examiner* — Ming Wu
(74) *Attorney, Agent, or Firm* — Squire Patton Boggs LLP; Sarah Mirza

(57) ABSTRACT

One embodiment of the present invention sets forth a technique for performing frame interpolation. The technique includes generating (i) a first set of feature maps based on a first set of rendering features associated with a first key frame, (ii) a second set of feature maps based on a second set of rendering features associated with a second key frame, and (iii) a third set of feature maps based on a third set of rendering features associated with a target frame. The technique also includes applying one or more neural networks to the first, second, and third set of feature maps to generate a set of mappings from a first set of pixels in the first key frame to a second set of pixels in the target frame. The technique further includes generating the target frame based on the set of mappings.

20 Claims, 9 Drawing Sheets

(56) References Cited

U.S. PATENT DOCUMENTS

| | | | | |
|---|---|---|---|---|
| 10,523,246 | B1* | 12/2019 | Zhang | H04B 7/0686 |
| 10,523,914 | B1* | 12/2019 | Phillips | H04N 21/21805 |
| 2019/0138889 | A1* | 5/2019 | Jiang | G06N 3/045 |
| 2019/0206121 | A1* | 7/2019 | Jin | G06T 15/005 |
| 2020/0012858 | A1* | 1/2020 | Xiang | G06T 7/73 |
| 2020/0160595 | A1* | 5/2020 | Lv | G06T 3/0012 |
| 2020/0311923 | A1* | 10/2020 | Walton | G06T 3/18 |
| 2020/0356827 | A1 | 11/2020 | Dinerstein et al. | |
| 2021/0064883 | A1* | 3/2021 | Sharma | G06V 20/41 |

OTHER PUBLICATIONS

Kalluri et al., "FLAVR: Flow-Agnostic Video Representations for Fast Frame Interpolation", https://arxiv.org/pdf/2012.08512.pdf, arXiv:2012.08512v2 [cs.CV] Apr. 15, 2021, 15 pages.

Jiang et al., "Super SloMo: High Quality Estimation of Multiple Intermediate Frames for Video Interpolation", https://arxiv.org/pdf/1712.00080.pdf, arXiv:1712.00080v2 [cs.CV] Jul. 13, 2018, 12 pages.

Wenbo Bao, Wei-Sheng Lai, Chao Ma, Xiaoyun Zhang, Zhiyong Gao, and Ming-Hsuan Yang. 2019, "Depth-Aware Video Frame Interpolation", In IEEE Conference on Computer Vision and Pattern Recognition, 10 pages.

D. Fourure, R. Emonet, E. Fromont, D. Muselet, A. Tremeau, and C. Wolf. 2017, "Residual conv-deconv grid network for semantic segmentation", arXiv preprintarXiv:1707.07958 (2017), 12 pages.

Junhwa Hur and Stefan Roth. 2019. "Iterative Residual Renement for Joint Optical Flow and Occlusion Estimation", In CVPR, 15 pages.

Simon Niklaus and Feng Liu. 2018. "Context-Aware Synthesis for Video Frame Interpolation", In The IEEE Conference on Computer Vision and Pattern Recognition (CVPR), 10 pages.

Simon Niklaus and Feng Liu. 2020. "Softmax Splatting for Video Frame Interpolation". In IEEE Conference on Computer Vision and Pattern Recognition, 10 pages.

O. Ronneberger, P. Fischer, and T. Brox. 2015. "U-Net: Convolutional Networks for Biomedical Image Segmentation". In Medical Image Computing and Computer-Assisted Intervention (MICCAI) (LNCS, vol. 9351). Springer, 234-241. http://lmb.informatik.uni-freiburg.de/Publications/2015/RFB15a (available on arXiv:1505.04597 [cs.CV]), 5 pages.

Xiangyu Xu, Li Siyao, Wenxiu Sun, Qian Yin, and Ming-Hsuan Yang. 2019. "Quadratic Video Interpolation". In Advances in Neural Information Processing Systems, H. Wallach, H. Larochelle, A. Beygelzimer, F. d'Alché-Buc, E. Fox, and R. Garnett (Eds.), vol. 32. Curran Associates, Inc. https://proceedings.neurips.cc/paper/2019/1ed045c59a90d7587d8d671b5f5aec4e7c-Paper.pdf, 10 pages.

Henning Zimmer, Fabrice Rousselle, Wenzel Jakob, OliverWang, David Adler, Wojciech Jarosz, Olga Sorkine-Hornung, and Alexander Sorkine-Hornung. 2015. "Path-space Motion Estimation and Decomposition for Robust Animation Filtering". Computer Graphics Forum (Proceedings of EGSR) 34, 4 (Jun. 2015). https://doi.org/10/f7mb34, 3 pages.

Extended European Search Report for Application No. 22170631.0 dated Oct. 28, 2022.

* cited by examiner

FRAME INTERPOLATION FOR RENDERED CONTENT

BACKGROUND

Field of the Various Embodiments

Embodiments of the present disclosure relate generally to frame interpolation and, more specifically, to frame interpolation for rendered content.

Description of the Related Art

Computer-animated video content is commonly created via a multi-stage process that involves generating models of characters, objects, and settings; applying textures, lighting, shading, and other effects to the models; animating the models; and rendering individual frames based on the animated models. During this process, the rendering stage typically incurs significantly more computational overhead than earlier stages. This computational overhead has also increased over time, as more complex and sophisticated rendering techniques are developed to improve the realism and detail in the rendered frames. For example, a single frame of computer-animated video content could require multiple hours to multiple days to render on a single processor. A feature-length film with over 100,000 frames would thus consume hundreds of years of processor hours.

To reduce rendering overhead associated with computer-animated video content, a subset of "key frames" in the computer-animated video content can be rendered, and remaining frames between pairs of consecutive key frames can be generated via less computationally expensive frame interpolation techniques. However, an interpolated frame is not created using the same amount of information (e.g., models, texture, lighting, shading, effects, etc.) as the corresponding key frames. Instead, the interpolated frame is typically generated by estimating optical flow between the key frames, using the estimated optical flow to warp pixels from the key frames, and blending the warped pixels. When the optical flow is estimated inaccurately or involves occlusions, the interpolated frame can include noticeable artifacts, blurriness, missing details, and/or other indicators of reduced visual quality. The reduced visual quality of interpolated frames further prevents frame interpolation from being widely used in generating computer-animated video content.

As the foregoing illustrates, what is needed in the art are techniques for improving the interpolation of frames associated with computer-animated video content.

SUMMARY

One embodiment of the present invention sets forth a technique for performing frame interpolation. The technique includes generating (i) a first set of feature maps based on a first set of rendering features associated with a first key frame, (ii) a second set of feature maps based on a second set of rendering features associated with a second key frame, and (iii) a third set of feature maps based on a third set of rendering features associated with a target frame to be interpolated based on the first key frame and the second key frame. The technique also includes applying one or more neural networks to the first set of feature maps, the second set of feature maps, and the third set of feature maps to generate a set of mappings from a first set of pixels in the first key frame to a second set of pixels in the target frame. The technique further includes generating the target frame based on the set of mappings.

One technical advantage of the disclosed techniques relative to the prior art is a reduction in computational overhead associated with rendering frames in computer-animated video content. In this regard, the disclosed techniques can be used to efficiently interpolate a subset of frames in the computer-generated video content from a different subset of rendered frames instead of rendering all frames in the computer-generated video content. Another technical advantage is a more detailed, sharp, or accurate interpolated target frame than interpolated frames generated by existing approaches. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
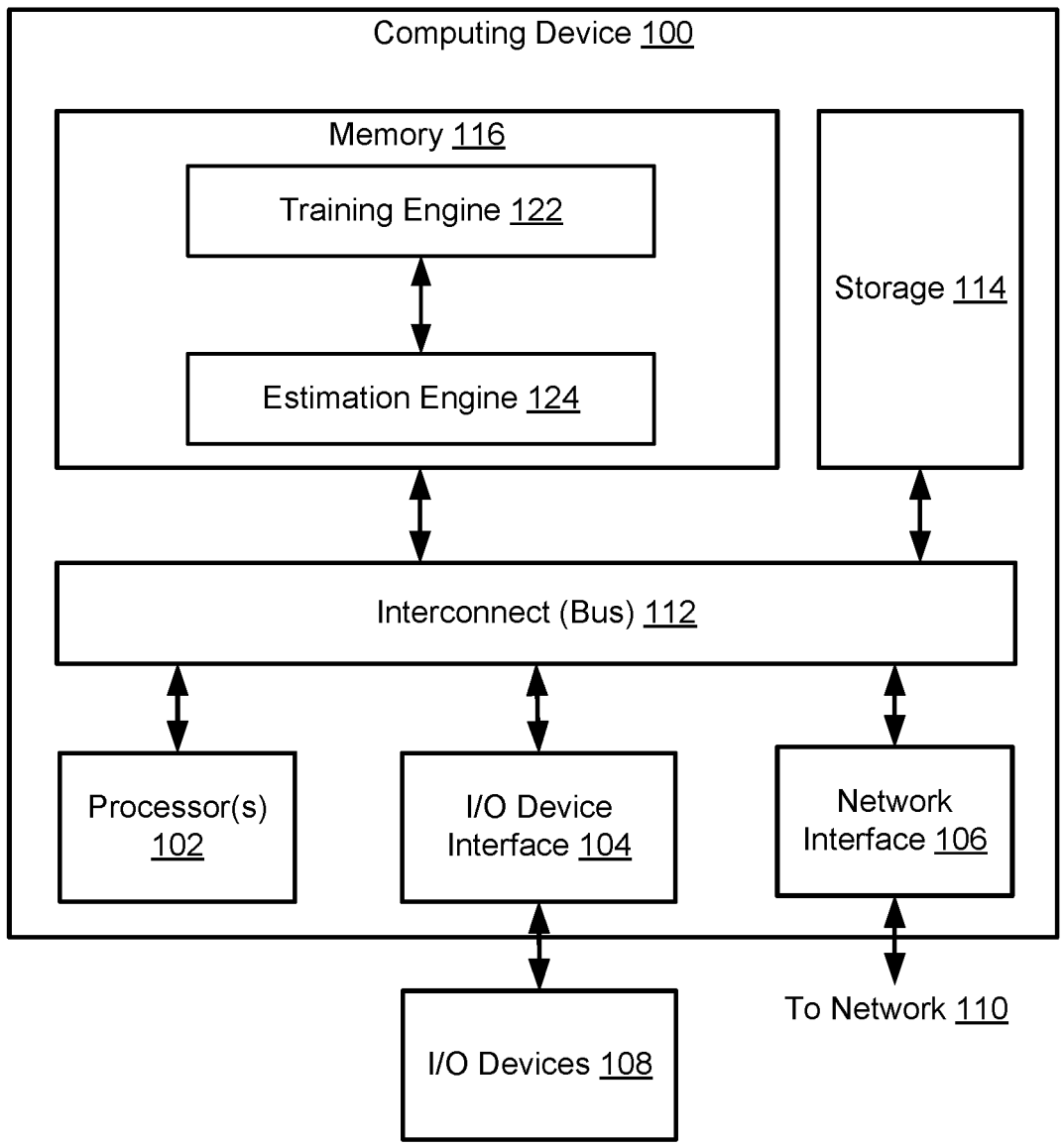
FIG. 1 illustrates a system configured to implement one or more aspects of various embodiments.

FIG. 1 illustrates a computing device 100 configured to implement one or more aspects of various embodiments. In one embodiment, computing device 100 may be a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and estimation engine 124 that reside in a memory 116. It is noted that the computing device described herein is illustrative and that any other technically feasible configurations fall within the scope of the present disclosure. For example, multiple instances of training engine 122 and estimation engine 124 may execute on a set of nodes in a distributed system to implement the functionality of computing device 100.

In one embodiment, computing device 100 includes, without limitation, an interconnect (bus) 112 that connects one or more processor(s) 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

In one embodiment, I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In one embodiment, network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

In one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Training engine 122 and estimation engine 124 may be stored in storage 114 and loaded into memory 116 when executed.

In one embodiment, memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and estimation engine 124.

Training engine 122 includes functionality to train a deep learning model to interpolate target frames between pairs of key frames in rendered video content, and estimation engine 124 includes functionality to use the deep learning model to interpolate additional target frames between new pairs of key frames. As described in further detail below, the deep learning model utilizes feature maps generated from "rendering features" for the key frames and target frames. These rendering features include additional attributes that are typically used to render the corresponding frames. By incorporating these additional attributes into various stages in the interpolation of a target frame from one or more key frames, the deep learning model improves the quality and accuracy of the target frame over existing frame interpolation techniques that do not utilize these additional attributes.

Frame Interpolation for Rendered Content

Figure 2:
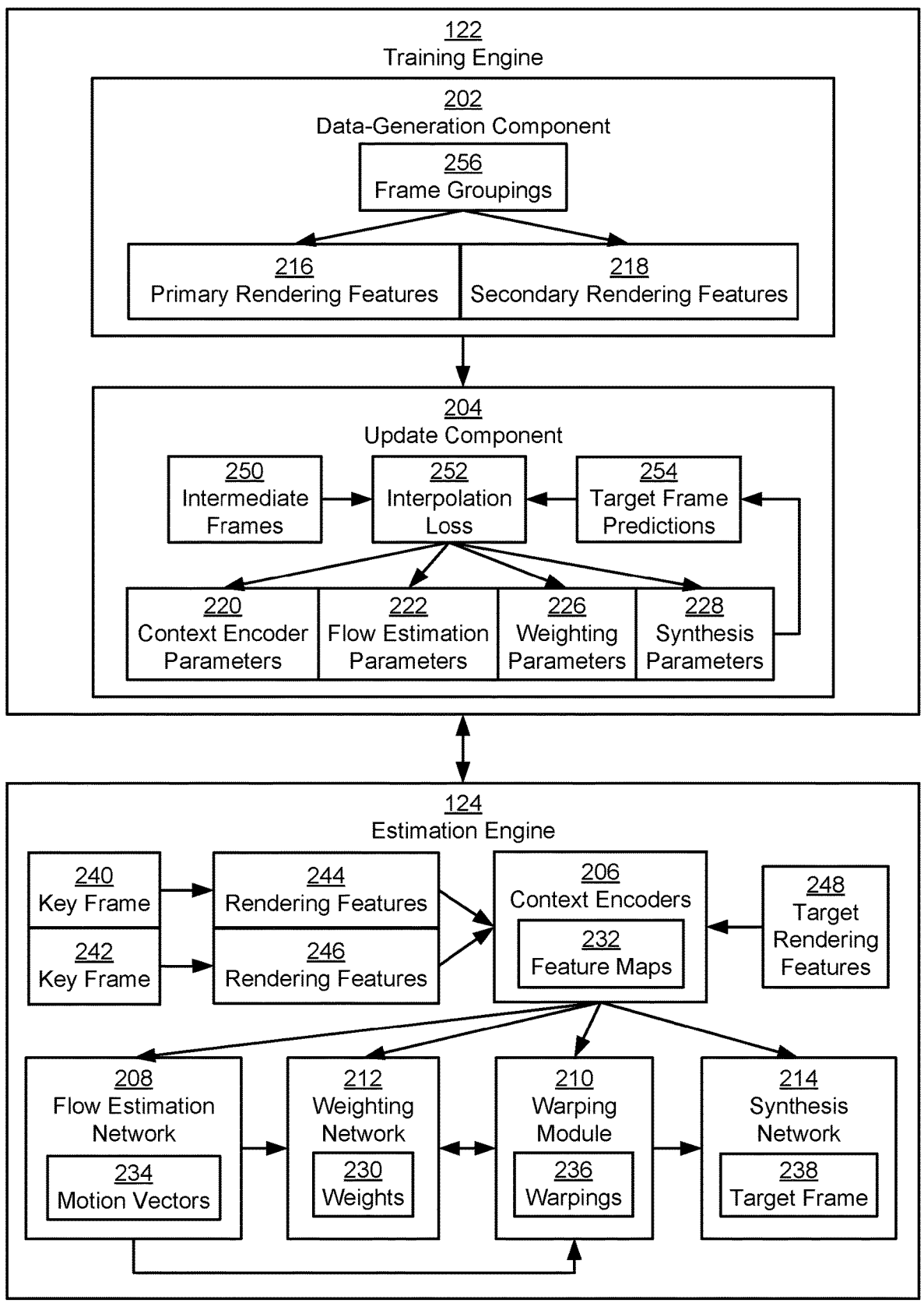
FIG. 2 is a more detailed illustration of the training engine and estimation engine of FIG. 1, according to various embodiments.

FIG. 2 is a more detailed illustration of training engine 122 and estimation engine 124 of FIG. 1, according to various embodiments. As shown in FIG. 2, training engine 122 and estimation engine 124 operate to train and execute a deep learning model that interpolates a target frame 238 that lies between two key frames 240 and 242 of video content. The deep learning model includes one or more context encoders 206, a flow estimation network 208, a warping module 210, a weighting network 212, and/or a synthesis network 214. Each of these components is described in further detail below.

In one or more embodiments, the deep learning model performs interpolation of target frame 238 using rendering features 244 and 246 associated with key frames 240 and 242, respectively, as well as target rendering features 248 associated with target frame 238. During execution of the deep learning model, estimation engine 124 inputs rendering features 244 and 246 and target rendering features 248 into one or more context encoders 206, and context encoders 206 produce feature maps 232 from each set of inputted features.

In some embodiments, rendering features 244 and 246 include a set of available features involved in the rendering of key frames 240 and 242, and target rendering features 248 include a subset of rendering features 244 and 246. In addition, features that can be found in rendering features 244 and 246 and target rendering features 248 can be grouped under secondary rendering features 218 for the corresponding frames, while features that are found only in rendering features 244 and 246 can be grouped under primary rendering features 216 for the corresponding key frames 240 and 242.

For example, rendering features 244 and 246 and target rendering features 248 may be defined for individual pixels in the corresponding frames, regions in the corresponding frames, and/or at one or more resolutions associated with the corresponding frames. Rendering features 244 and 246 that are available for rendered key frames 240 and 242 may include, without limitation, colors, albedos, surface normal vectors, depths, motion vectors, alpha channels, object identifiers, texture coordinates, per-light outputs, and light path dependent decompositions. Target rendering features 248 available for target frame 238 may include albedos, surface normal vectors, depths, motion vectors, alpha channels, object identifiers, and texture coordinates and exclude colors, per-light outputs, and light path dependent decompositions. Thus, target rendering features 248 include all rendering features 244 and 246 except those that are generated during or after rendering of a frame. In turn, secondary rendering features 218 associated with key frames 240 and 242 and target frame 238 include albedos, surface normal vectors, depths, motion vectors, alpha channels, object identifiers, and texture coordinates, while primary rendering features 216 associated with only key frames 240 and 242 include colors, albedos, surface normal vectors, depths, motion vectors, alpha channels, object identifiers, texture coordinates, per-light outputs, and light path dependent decompositions.

In some embodiments, context encoders 206 include one or more primary context encoders that generate primary feature maps from primary rendering features 216, and one or more secondary context encoders that generate secondary feature maps from secondary rendering features 218. Each context encoder extracts, from a corresponding set of rendering features, a set of feature maps at multiple resolutions. For example, each context encoder may generate a "feature pyramid" that includes multiple feature maps 232 from a corresponding set of primary or secondary rendering features. The feature pyramid may include a feature map at the resolution of the corresponding frame and one or more feature maps at different resolutions. For example, the feature pyramid may include a feature map at the resolution of the corresponding frame, a feature map at half the resolution of the corresponding frame, a feature map at a quarter the resolution of the corresponding frame, and/or one or more feature maps at additional resolutions.

Feature maps 232 produced by context encoders 206 are used by flow estimation network 208, warping module 210, weighting network 212, and/or synthesis network 214 to generate target frame 238. First, flow estimation network 208 uses feature maps 232 associated with key frames 240 and 242 and target frame 238 to generate motion vectors 234 that represent optical flow among key frames 240 and 242 and target frame 238. As described in further detail below with respect to FIGS. 3A-3C, flow estimation network 208 may improve the accuracy of motion vectors 234 via iterative residual refinement of previous optical flow estimates using the same weights and/or estimation of nonlinear motion between a key frame (e.g., key frame 240 or key frame 242) and target frame 238.

Next, the same feature maps 232 and/or different feature maps 232 and motion vectors 234 produced by flow estimation network 208 are inputted into warping module 210 to generate warpings 236 from pixels in one or more key frames 240 and/or 242 to pixel locations in target frame 238. As described in further detail below with respect to FIG. 4, warpings 236 may include forward warping of pixel locations and corresponding feature maps 232 from a first key frame (e.g., key frame 240) that temporally precedes target frame 238 onto target frame 238 using a first set of motion vectors 234 that represent forward flow from the first key frame to a second key frame (e.g., key frame 242) that temporally succeeds target frame 238. Warpings 236 may additionally include forward warping of pixel locations and corresponding feature maps 232 from the second key frame onto target frame 238 using a second set of motion vectors 234 that represent backward flow from the second key frame to the first key frame.

Feature maps 232 are also inputted into weighting network 212 to generate weights 230 that indicate the relative importances of pixels in key frames 240 and/or 242 with motion vectors 234 that point to the same pixel locations in target frame 238. Weights 230 can then be provided to warping module 210 to produce and/or revise warpings 236 from pixels in key frames 240 and/or 242 to pixels in target frame 238. Weighting network 212 is described in further detail below with respect to FIGS. 5A and 5B.

Feature maps 232, warpings 236, weights 230, and/or other output associated with context encoders 206, warping module 210, and/or weighting network 212 are then inputted into synthesis network 214 to produce target frame 238. For example, warpings 236 of pixels and/or feature maps associated with key frames 240 and/or 242 onto target frame 238 may be merged by a preprocessing network (not shown) and/or another component into a "candidate" frame representing target frame 238, and the candidate frame may be refined by one or more additional portions of synthesis network 214 to produce a final interpolated target frame 238. An example preprocessing network is described in further detail below with respect to FIG. 6.

In operation, training engine 122 trains context encoders 206, flow estimation network 208, warping module 210, weighting network 212, synthesis network 214, and/or other components of the deep learning model to adapt each component to the frame interpolation task. A data-generation component 202 in training engine 122 produces training data for the deep learning model, and an update component 204 in training engine 122 uses the training data to update parameters of the deep learning model.

More specifically, data-generation component 202 generates frame groupings 256 from sequences of frames in one or more videos. Each frame grouping includes a pair of key frames and one or more target frames that temporally lie in between the key frames and serve as ground truth data for the frame interpolation task. For example, data-generation component 202 may divide a given video into frame groupings 256 of three frames each. Within each frame grouping, the first and last frames act as key frames, and an intermediate frame 250 that lies at the temporal midpoint between the preceding frame and the succeeding frame is used as the ground truth for a frame to be interpolated using the two key frames. In another example, data-generation component 202 may divide a video into frame groupings 256 of four or more frames each. Within each frame grouping, the first and last frames act as key frames, and one or more intermediate frames 250 that lie between the first and last frames (e.g., at the midpoint between the two key frames or closer to one key frame than another) are used as ground truth frames for an interpolation task that involves interpolating multiple target frames between two key frames and/or interpolating a target frame that temporally lies closer to one key frame than another.

Data-generation component 202 also retrieves and/or produces primary rendering features 216 and secondary rendering features 218 associated with frames in frame groupings 256. As mentioned above, secondary rendering features 218 may include all features that are common to both key frames and target frames, and primary rendering features 216 may include all rendering features that are available for rendered key frames. For example, secondary rendering features 218 may include attributes that assist in rendering of the corresponding target frames, such as albedos, surface normal vectors, depths, motion vectors, alpha channels, object identifiers, texture coordinates. Primary rendering features 216 may include some or all secondary rendering features 218, as well as additional attributes that are available only after a frame is rendered, such as (but not limited to) pixel colors, per-light outputs, and/or light path dependent decompositions. Thus, data-generation component 202 may generate secondary rendering features 218 as a set of features available for each target frame and a corresponding subset of features available for each key frame. Data-generation component 202 may also generate primary rendering features 216 as a set of features available for each key frame.

Update component 204 uses frame groupings 256, primary rendering features 216, and secondary rendering features 218 to update context encoder parameters 220 of context encoders 206, flow estimation parameters 222 of flow estimation network 208, weighting parameters 226 of weighting network 212, and/or synthesis parameters 228 of synthesis network 214. In one or more embodiments, update component 204 performs unsupervised training that updates context encoder parameters 220, flow estimation parameters 222, weighting parameters 226, and/or synthesis parameters 228 based on an interpolation loss 252 that is calculated between intermediate frames 250 in frame groupings 256 and the corresponding target frame predictions 254 outputted by synthesis network 214.

For example, update component 204 may apply context encoders 206, flow estimation network 208, warping module 210, weighting network 212, and synthesis network 214 to primary rendering features 216, secondary rendering features 218, and/or other features or output associated with each frame grouping to produce one or more target frame predictions 254 representing estimates by the deep learning model of one or more intermediate frames 250 in between the key frames in the frame grouping. Update component 204 may calculate interpolation loss 252 based on one or more differences (e.g., color-based differences, feature-based differences, etc.) between target frame predictions 254 and the corresponding ground truth intermediate frames 250. Interpolation loss 252 may additionally be calculated at multiple scales associated with feature maps 232. Update component 204 may then use a training technique (e.g., gradient descent and backpropagation) and/or one or more hyperparameters to iteratively update context encoder parameters 220, flow estimation parameters 222, weighting parameters 226, and/or synthesis parameters 228 in a way that reduces subsequent interpolation loss 252 associated with frame groupings 256 in the training data.

In some embodiments, hyperparameters include attributes that define or control "higher-level" properties of the deep learning model. These hyperparameters are distinguished from internal parameters (e.g., context encoder parameters 220, flow estimation parameters 222, weighting parameters 226, synthesis parameters 228, etc.) used by the deep learning model to generate output from a given set of input. For example, the hyperparameters include, but are not limited to, a learning rate that controls the rate at which the internal parameters of a given model are updated during training; a configuration hyperparameter that specifies the number of blocks, layers, connections, and/or other components in the architecture of a corresponding neural network; and/or one or more thresholds for removing links with low weights in a neural network.

Update component 204 may also, or instead, train various components of the deep learning model at different times and/or using different techniques. For example, update component 204 could initially perform supervised training of flow estimation parameters 222 in flow estimation network 208 (and optionally one or more context encoders 206 that generate feature maps 232 used by flow estimation network 208) using a separate dataset of ground truth motion vectors (not shown) from key frames to intermediate frames 250 in frame groupings 256. After training of flow estimation network 208 is complete, update component 204 could train remaining components of the deep learning model (e.g., warping module 210, weighting network 212, synthesis network 214, etc.) in an unsupervised fashion using interpolation loss 252. This separate supervised training of flow estimation network 208 allows flow estimation network 208 to learn nonlinear motion among key frames and/or intermediate frames 250 in frame groupings 256.

Update component 204 may continue training some or all components of the deep learning model over a series of training iterations and/or epochs until a condition indicating a completion of training is met. This condition may include, but is not limited to, convergence in parameters of the deep learning model, the lowering of interpolation loss 252 and/or other losses associated with the training to below a threshold, and/or the execution of a certain number of training steps, iterations, batches, and/or epochs. After training of the deep learning model is complete, the deep learning model may be used to interpolate target frames from pairs (or other combinations) of key frames 240 and 242, as discussed above.

Those skilled in the art will appreciate that feature maps 232 can be generated and/or used with flow estimation network 208, warping module 210, weighting network 212, and/or synthesis network 214 in a variety of ways. First, different context encoders 206 may be created to generate feature maps 232 for different neural networks or components of the deep learning model (e.g., flow estimation network 208, warping module 210, weighting network 212, synthesis network 214, etc.), or the same context encoder or set of context encoders 206 may be used to generate features maps 232 that are used by multiple neural networks or components of the deep learning model. Second, one or more context encoders 206 may be incorporated as layers or blocks into flow estimation network 208, weighting network 212, synthesis network 214, and/or other components of the deep learning model. Third, feature maps 232 may be generated from additional groupings of rendering features that are different from the groupings associated with primary rendering features 216 and secondary rendering features 218. Fourth, feature maps 232 may be selectively used or omitted from use with flow estimation network 208, warping module 210, weighting network 212, and/or synthesis network 214 to accommodate requirements or limitations associated with the processing demands, performance, speed, or scalability of the associated interpolation task.

Those skilled in the art will also appreciate that training engine 122, estimation engine 124, and/or the deep learning model may be adapted to perform frame interpolation in other ways. First, training engine 122, estimation engine 124, context encoders 206, flow estimation network 208, warping module 210, weighting network 212, synthesis network 214, and/or other components may be configured to predict target frame 238 using features associated with a single key frame and/or more than two key frames. Second, these components may be configured to predict multiple target frames in between two key frames. Third, training engine 122, estimation engine 124, context encoders 206, flow estimation network 208, warping module 210, weighting network 212, and/or synthesis network 214 may be omitted from the deep learning model, replaced with a component that performs a similar function, and/or combined with one or more other components in the deep learning model.

Figure 3A:
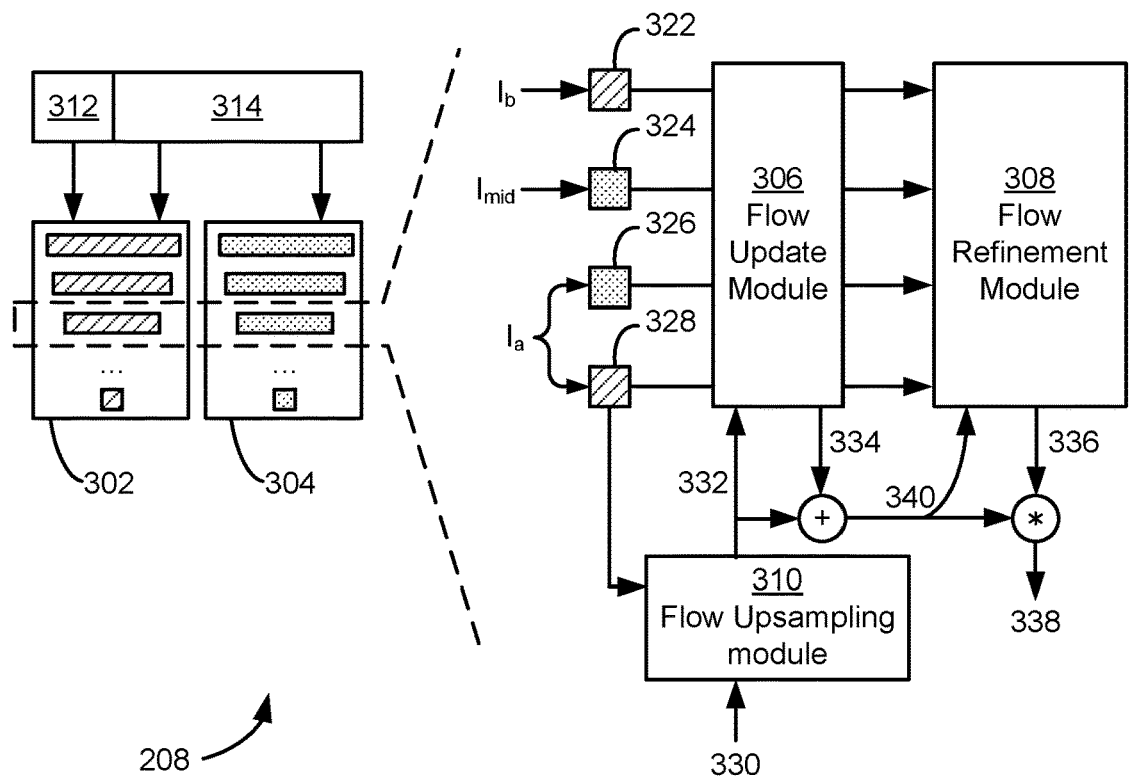
FIG. 3A is an example architecture associated with the flow estimation network of FIG. 2, according to various embodiments.

FIG. 3A is an example architecture associated with flow estimation network 208 of FIG. 2, according to various embodiments. As shown in FIG. 3A, input into flow estimation network 208 includes two different types of feature pyramids 302 and 304. Feature pyramid 302 includes feature maps generated at multiple scales from two sets of features 312 and 314, and feature pyramid 304 includes feature maps generated at multiple scales from one set of features 314. For example, feature pyramid 302 may be produced by a context encoder (e.g., context encoders 206) from primary rendering features that include features 314 available for both target frames and key frames in an interpolation task and additional features 312 available only to the key frames in the interpolation task. Feature pyramid 304 may be produced by a different context encoder from secondary rendering features, which include some or all features 314 available for both target frames and key frames in the interpolation task.

More specifically, flow estimation network 208 includes a flow update module 306, a flow refinement module 308, and a flow upsampling module 310 that operate on feature maps 322, 324, 326, and 328 from both types of feature pyramids 302 and 304. Feature map 322 may be found in a first feature pyramid generated from primary features 312 and 314 associated with a key frame (e.g., key frame 242) that succeeds a target frame and is represented by $I_b$, feature map 324 may be found in a second feature pyramid generated from secondary features 314 associated with a target frame (e.g., target frame 238) represented by $I_{mid}$, feature map 326 may be found in a third feature pyramid generated from secondary features 314 associated with a key frame (e.g., key frame 240) that precedes the target frame and represented by $I_a$, and feature map 328 may be found in a fourth feature pyramid generated from primary features 312 and 314 associated with the key frame $I_a$. While FIG. 3A shows four feature maps 322, 324, 326, and 328 as input into flow estimation network 208, those skilled in the art will appreciate that flow estimation network 208 can be applied to various types, numbers, and/or combinations of feature maps produced from one or more sets of features associated with the preceding key frame, target frame, and/or succeeding key frame.

For a set of feature maps 322, 324, 326, and 328 at a given scale, flow upsampling module 310 generates an upsampled flow 332 by spatially upsampling a flow 330 at the next lowest scale in feature pyramids 302 and 304. For example, flow upsampling module 310 may generate upsampled flow 332 by performing a bilinear flow upsampling of flow 330 and rescaling by the corresponding upsample factor. In another example, flow upsampling module 310 may generate upsampled flow 332 by selecting a flow value in upsampled flow 332 from a neighbor in flow 330 that is associated with the lowest difference in feature map values across the scales associated with flow 330 and upsampled flow 332. In a third example, flow upsampling module 310 may use joint bilateral upsampling to estimate a sampling kernel for each pixel in upsampled flow 332 based on a corresponding feature map at the same resolution as upsampled flow 332. In a fourth example, flow upsampling module 310 may include a neural network that processes upsampled flow values produced by another upsampling technique and a feature map at the same resolution to produced sharpened flow values. In some or all examples, if feature maps 322, 324, 326, and 328 are at the lowest scale associated with feature pyramids 302 and 304, flow upsampling module 310 may set upsampled flow 332 to 0 (because no lower resolution flow 330 exists).

In some embodiments, flow update module 306 and flow refinement module 308 use similar inputs and/or components to iteratively update and refine upsampled flow 332 across multiple scales associated with feature maps 322, 324, 326, and 328. More specifically, flow update module 306 generates a residual update 334 from each upsampled flow 332. The generated residual update 334 is applied to upsampled flow 332 to produce an updated flow 340, and the result is inputted into flow refinement module 308 to produce kernels 336 that are convolved with updated flow 340 to produce a flow refinement 338. The process is then repeated until flow refinement 338 is generated at the highest scale associated with feature maps 322, 324, 326, and 328. Flow refinement 338 at the highest scale is then used as the output of flow estimation network 208.

Figure 3B:
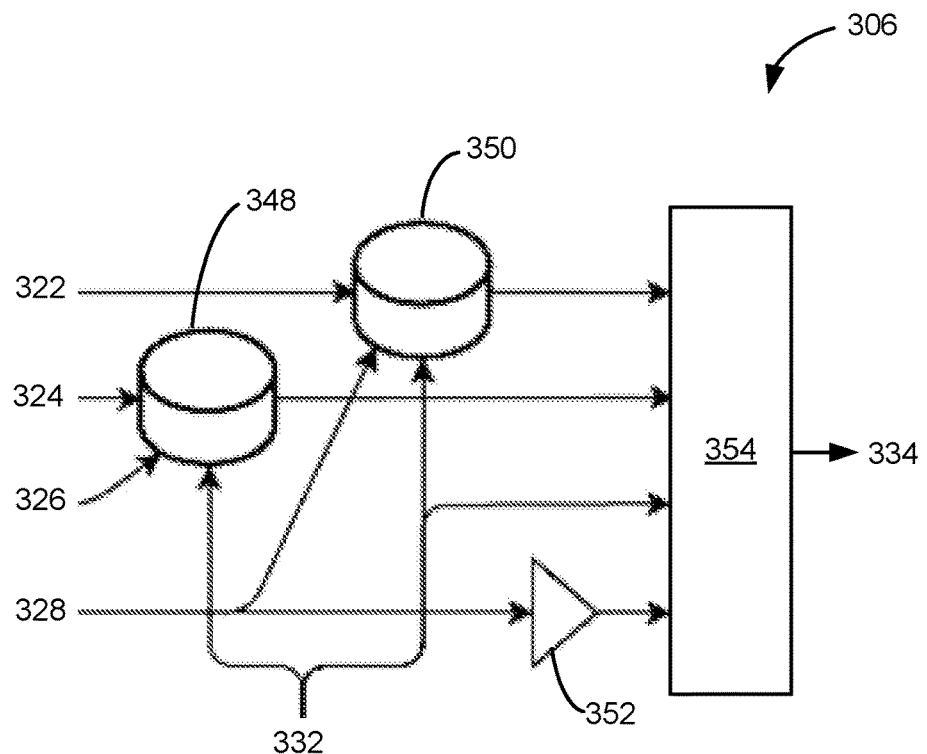
FIG. 3B is a more detailed illustration of the flow update module of FIG. 3A, according to various embodiments.

FIG. 3B is a more detailed illustration of flow update module 306 of FIG. 3A, according to various embodiments. As shown in FIG. 3B, input into flow update module 306 includes feature maps 322, 324, 326, and 328 at a given scale (e.g., resolution). A first component 348 in flow update module 306 performs warping and correlation associated with feature maps 324 and 326. For example, component 348 may warp feature map 326 based on upsampled flow 332 and construct a cost volume that stores matching costs for associating the warped feature map 326 with feature map 324. Within the cost volume, a matching cost is calculated based on the correlation between a feature in feature map 324 and a corresponding warped feature in the warped feature map 326. A second component 350 in flow update module 306 performs a similar warping and correlation associated with feature maps 322 and 328 based on upsampled flow 332.

A third component 352 in flow update module 306 (or flow refinement module 308) performs feature reduction of feature map 328. The output of components 348, 350, and 352 are then fed into a neural network 354 that generates residual update 334.

As mentioned above, flow update module 306 and flow refinement module 308 may use similar inputs and/or components to update and refine upsampled flow 332. Thus, FIG. 3B can also be adapted to illustrate the operation of flow refinement module 308 of FIG. 3A. In particular, upsampled flow 332 may be replaced with updated flow 340 to illustrate the use of components 348, 350, and 352 in flow refinement module 308. Components 348 and 350 in flow refinement module 308 may also use different correlation sizes to compute the corresponding cost volumes than the corresponding components in flow update module 306. Further, neural network 354 in flow update module 306 may be replaced with a different neural network 354 that generates one or more kernels 336 as output instead of residual update 334.

In one or more embodiments, neural network 354 in flow refinement module 308 includes a sequential neural network that estimates spatially varying 3×3 flow filtering kernels 336 based on a set of input. This input includes, but is not limited to, updated flow 340, one or more feature maps 326 or 328 associated with the first key frame, a correlation between the two key frames, and/or a correlation between the first key frame and the target frame.

In one or more embodiments, the operation of flow estimation network 208 can be represented by the following equations:

$$f^i = \begin{cases} F^i(\hat{f}^i), & \text{if } 5 < i \leq 7 \\ F^i(R^i + \hat{f}^i), & \text{if } i \leq 5 \\ 0, & \text{if } i = 0 \end{cases} \quad (1a)$$

$$R^i = D\left(Q^i(pp_a^i), corr_4(pp_a^i, pp_b^i, \hat{f}^i), corr_3(sp_a^i, sp_{mid}^i, \hat{f}^i \cdot t), \hat{f}^i\right) \quad (1b)$$

-continued $$F^i(f) = K(Q^i(pp_a^i), corr_1(pp_a^i, pp_b^i, f), corr_1(sp_a^i, sp_{mid}^i, f \cdot t), f) * f \quad (1c)$$

$$corr_n(a, b, f) = corr'_n(a, \overleftarrow{W}(b, f)) \quad (1d)$$

$$corr'_n(a, b) = \sum_{-n,n}\sum_{-n,n} \frac{1}{|N|} a_{offset} \cdot b_{offset} \quad (1e)$$

In the above equations, $F^i$ is the ith level flow refinement 338, $R^i$ is the ith level residual update 334, and $\hat{f}^i$ is the ith level upsampled flow 332 generated from flow 330 $f^{i-1}$. In addition, D is the residual update neural network 354 in flow update module 306, K is the filtering kernel prediction neural network 354 in flow refinement module 308, and $Q^i$ is the feature reduction component 352 for a given level or scale associated with feature pyramids 302 and 304. Further, $pp_x^i$ is the ith level primary feature map representation of input x, $sp_x^i$ is the ith level secondary feature map representation of input x, $corr_n$ is the warping and cost correlation performed by a corresponding component 348 or 350, and $\overleftarrow{W}$ is backward warping.

In some embodiments, the inputs to and components of flow estimation network 208 described with respect to FIGS. 3A-3B allow flow estimation network 208 to estimate non-linear motion across the key frames and the target frame. More specifically, input into neural network 354 of flow update module 306 and/or flow refinement module 308 may include cost volumes between feature maps of secondary features of the target frame and one or more key frames; feature maps 322, 324, 326, and 328; cost volumes between a first key frame and a backward warped second key frame; and upsampled flow 332 or updated flow 340. The cost volumes computed between the feature maps of the target frame and key frame(s) allow neural network 354 to identify any "shift" in the motion associated with the target frame toward one key frame.

An additional variation to the operation of flow estimation network 208 includes inputting external estimates or values of optical flow into one or more components of flow estimation network 208. These external estimates or values can then be combined with existing processing performed by flow estimation network 208 to guide or improve the flow estimates produced by flow estimation network 208, as described in further detail below with respect to FIG. 3C.

Figure 3C:
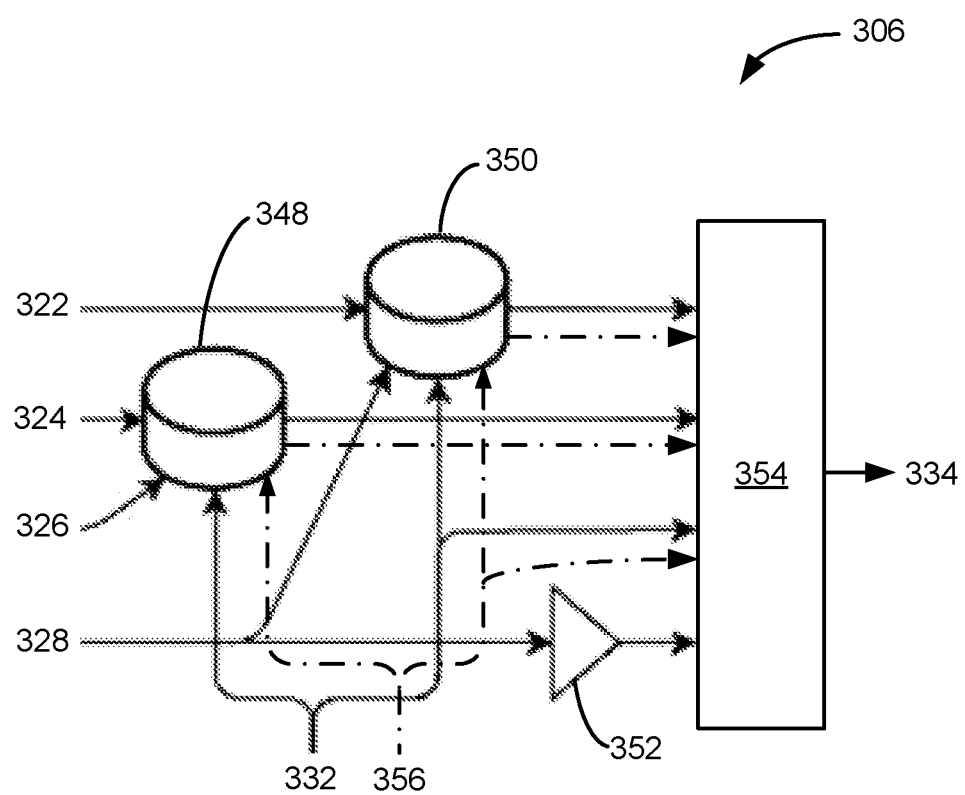
FIG. 3C is a more detailed illustration of the flow update module of FIG. 3A, according to other various embodiments.

FIG. 3C is a more detailed illustration of flow update module 306 of FIG. 3A, according to other various embodiments. As with the illustration of flow update module 306 of FIG. 3B, the illustration of FIG. 3C includes a number of components 348, 350, 352 that process feature maps 322, 324, 326, and 328 to generate additional inputs into neural network 354. Neural network 354 than generates residual update 334 from the additional inputs.

As shown in FIG. 3C, an additional flow 356 is inputted into components 348 and 350. Flow 356 may include motion vectors used to render the target frame, a flow generated by a different flow estimation technique, and/or representations of motion between or across the key frames and target frame. Each of components 348 and 350 may use flow 356 to generate smaller cost volumes between the corresponding feature maps, and the smaller cost volumes may be added to the inputs of neural network 354. Referring to the operation of flow estimation network 208 as represented by Equations 1a-1e, flow 356 may be represented by $f_c$, and the smaller cost volumes may be added as $corr_3$ ($sp_a^i$, $sp_{mid}^i$, $f_c \cdot t$) and/or $corr_4$ ($pp_a^i$, $pp_b^i$, $ff_c$) to the inputs of D in Equation 1b.

Figure 4:
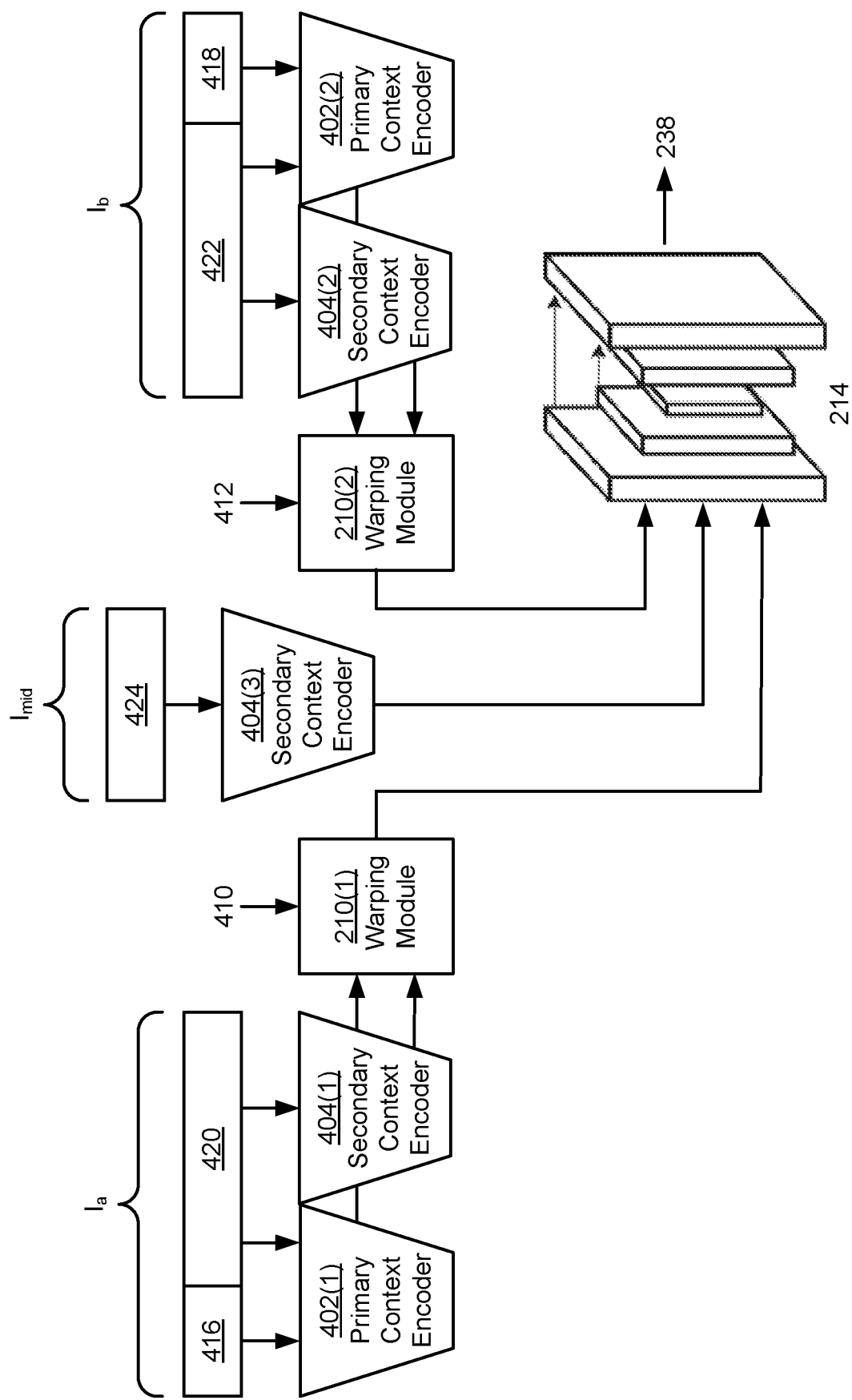
FIG. 4 is an example architecture associated with the warping module and synthesis network of FIG. 2, according to various embodiments.

FIG. 4 is an example architecture associated with warping module 210 and synthesis network 214 of FIG. 2, according to various embodiments. As shown in FIG. 4, the architecture includes two instances of a primary context encoder 402(1)-(2), each of which is referred to herein as primary context encoder 402. The partial architecture also includes three instances of a secondary context encoder 404(1)-(3), each of which is referred to herein as secondary context encoder 404. The partial architecture further includes two instances of warping module 210(1)-(2), each of which is referred to herein as warping module 210.

In one or more embodiments, primary context encoder 402 generates a set of feature maps from a given set of primary features, and secondary context encoder 404 generates a set of feature maps from a given set of secondary features. As discussed above, a set of secondary features may include a subset of features found in a set of primary features. Further, the secondary features may be available for a target frame $I_{mid}$ to be interpolated, while the primary features may include the secondary features and additional features that are available only for key frames $I_a$ and $I_a$ from which the target frame is to be interpolated. These additional features may include color values for the rendered key frames and/or other data generated during the rendering process.

More specifically, secondary context encoder 404(3) converts a set of secondary features 424 from the target frame $I_{mid}$ to be interpolated into a first set of feature maps, secondary context encoder 404(1) converts a set of secondary features 420 from the key frame $I_a$ that precedes the target frame into a second set of feature maps, and secondary context encoder 404(2) converts a set of secondary features 422 from the key frame $I_b$ that succeeds the target frame into a third set of feature maps. Primary context encoder 402(1) converts a set of primary features that includes secondary features 420 and additional features 416 for $I_a$ into a fourth set of feature maps, and primary context encoder 402(2) converts another set of primary features that includes secondary features 422 and additional features 418 for $I_b$ into a fifth set of feature maps.

Feature maps produced by primary context encoder 402 and secondary context encoder 404 may optionally be used as input into other components of the deep learning model of FIG. 2, such as flow estimation network 208, weighting network 212, and/or synthesis network 214. Alternatively, feature maps inputted into each of flow estimation network 208, warping module 210, weighting network 212, and/or synthesis network 214 may be generated by different primary and secondary context encoder that are adapted to the task performed by the corresponding network.

Feature maps generated by primary context encoder 402(1) and secondary context encoder 404(1) and a forward flow 410 from the preceding key frame to the succeeding key frame are inputted into warping module 210(1), and feature maps generated by primary context encoder 402(2) and secondary context encoder 404(2) and a backward flow 412 from the succeeding key frame to the preceding key frame are inputted into warping module 210(2). Forward flow 410 and backward flow 412 may be generated by flow estimation network 208 using the techniques described above. Forward flow 410 and/or backward flow 412 may also, or instead, be provided by another source and/or generated using other flow estimation techniques.

Warping module 210(1) uses forward flow 410 to perform forward warping of feature maps generated by primary context encoder 402(1) and secondary context encoder 404(1) onto locations in the target frame $I_{mid}$. Warping module 210(2) uses backward flow 412 to perform forward warping of feature maps generated by primary context encoder 402(2) and secondary context encoder 404(2) onto locations in the target frame $I_{mid}$. Thus, the output of warping module 210(1) includes warped feature maps associated with $I_a$, and the output of warping module 210(2) includes warped feature maps associated with $I_b$.

In one or more embodiments, warping module 210 generates warped feature maps from weights 230 from weighting network 212 and motion vectors 234 in the respective flow 410 or 412 by adding each pixel in a source key frame $I_a$ or $I_b$ from which the flow originates to the target frame $I_{mid}$ via a displacement vector $F_{a \to mid}$ or $F_{b \to mid}$. After one or more pixels are warped from the source key frame onto the target frame, warping module 210 scales and normalizes the warped pixels using a set of weights. The operation of warping module 210 can be represented by the following equations:

$$T_i^c = \frac{\sum_j^{NM} S_j^c W_{i,j}}{\sum_j^{NM} W_{i,j} + \epsilon} \forall i \in [1; NM], \forall c \in [1; C] \quad (3a)$$

$$W_{i,j} = w_j k((x_i - x_j) - F_j^u) k((y_i - y_j) - F_j^v) \quad (3b)$$

$$k(d) = \max(0, 1 - |d|) \quad (3c)$$

In the above equations, $S_j^c$ is the value of channel c at the location $(x_j, y_j)$ for the source key frame, and $T_i^c$ is the value of channel c at the location $(x_i, y_i)$ for the target frame $I_{mid}$. In addition, C is the number of channels in each frame, and N and M represent the dimensions of each frame. Further, $F_i^u$ and $F_i^v$ are the horizontal and vertical flow values of the displacement vector at location $(x_i, y_i)$, $W_{i,j}$ is an overall weight that is associated with the mapping of the source pixel at location $(x_j, y_j)$ to the target pixel at location $(x_i, y_i)$, and k(d) is a chosen bilinear kernel function. Finally, $w_j$ is a weight representing the relative importance of a source pixel at location $(x_j, y_j)$. This weight can be produced by weighting network 212, as described in further detail below with respect to FIG. 5B.

The warped feature maps produced by warping module 210 and the feature maps produced by secondary context encoder 404(3) are inputted into synthesis network 214 to generate target frame 238. In some embodiments, synthesis network 214 includes a GridNet architecture with three rows, six columns, and transposed convolutions replaced by bilinear upsampling layers. The GridNet processes features in a grid of rows and columns, so that the layers in each row form a stream in which the feature resolution is kept constant and each stream processes information at a different scale. The columns in the grid connect the streams to exchange information via downsampling and upsampling layers. Because the GridNet generates target frame 238 from a combination of warped key frames in the warped feature maps produced by warping module 210 and additional contextual information in the warped feature maps and unwarped feature maps produced by secondary encoder 404(3), synthesis network 214 is able to mitigate reductions in visual quality caused by occlusions and errors associated with forward flow 410 and/or backward flow 412.

In some embodiments, additional processing of warped and unwarped feature maps outputted by warping module 210 and secondary context encoder 404(3), respectively, may be performed before or after inputting the feature maps into synthesis network 214. This additional processing includes multiple variations listed below. Each variation can be used alone or optionally combined with one or more other variations. First, the warped feature maps for both key frames may be added to the unwarped feature map for target frame 238, and the resulting sum may be inputted into synthesis network 214. Second, weights 230 generated by weighting network 212 may be included in the input into synthesis network 214 to improve the evaluation of the warped feature maps by synthesis network 214. Third, instead of concatenating input channels into a single tensor on each level and applying a convolutional neural network to the result, the warped key frames may be manually merged with respect to a time step parameter t to improve interpolation of target frame 238 when target frame 238 is temporally close to one of the key frames. This may be performed using a warp-mask-aware linear interpolation of the warped feature maps, as represented by $(1-t) * I_a + t * I_b$. Fourth, a separate preprocessing network may be used to merge the warped and unwarped feature maps and corresponding weights 230 to generate a merged representation that is used as input into synthesis network 214, as described in further detail below with respect to FIG. 6. Fifth, instead of merging the warped input key frames, the temporal positions of the key frames may be kept separate, and the GridNet architecture in synthesis network 214 may be replaced with a GridNet3D architecture that uses three-dimensional (3D) convolutions to estimate target frame 238. Sixth, synthesis network 214 may be configured to predict merging kernels that are applied to warped color inputs to produce target frame 238. The merging kernels can also be independently applied to other feature channels (e.g., alpha channel, per-light renders, etc.).

Figure 5A:
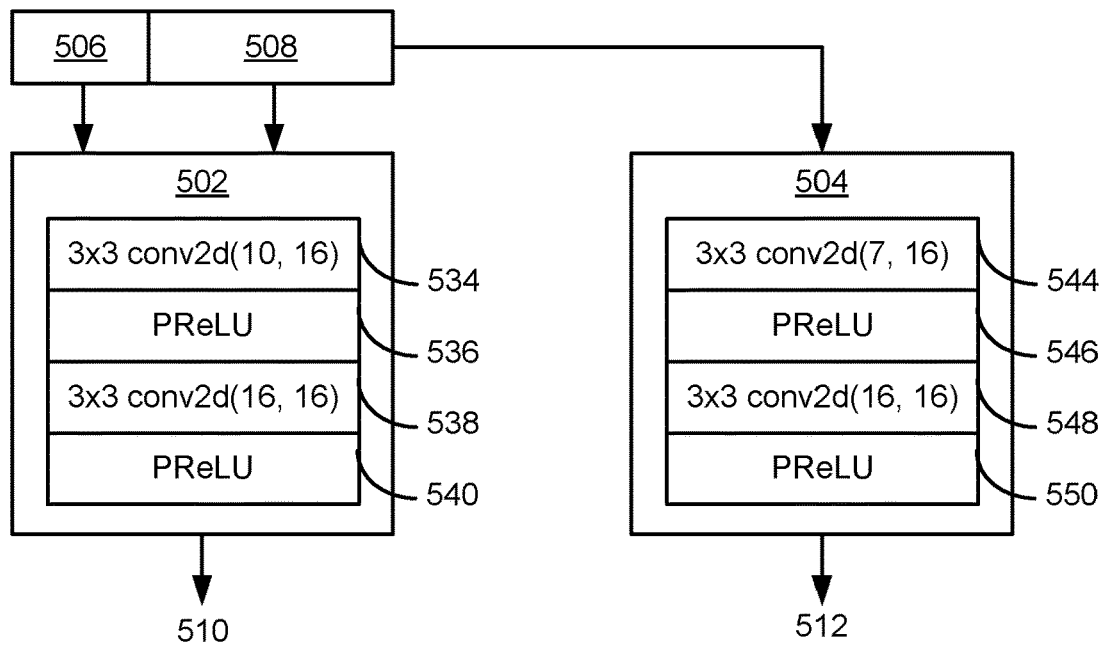
FIG. 5A is an example architecture associated with the context encoders of FIG. 2, according to various embodiments.

FIG. 5A is an example architecture associated with context encoders 206 of FIG. 2, according to various embodiments. More specifically, FIG. 5A shows a primary context encoder 502 and a secondary context encoder 504 that generate respective feature maps 510 and 512. These feature maps 510 and 512 can be inputted into weighting network 212, as described in further detail below with respect to FIG. 5B. Primary context encoder 502 and secondary context encoder 504 may optionally be used to generate feature maps that are inputted into other components, such as (but not limited to) flow estimation network 208, warping module 210, and/or synthesis network 214.

As shown in FIG. 5A, input into secondary context encoder 504 includes a set of secondary features 508, and input into primary context encoder 502 includes a primary set of features that includes secondary features 508 as well as additional features 506. As mentioned above, features 508 may be available for one or more key frames and a target frame to be interpolated using the key frame(s), and features 506 may be available only for the key frame(s).

Primary context encoder 502 includes four layers 534, 536, 538, and 540. Layer 534 is a 3×3 two-dimensional (2D) convolution with 10 input channels and 16 output channels, layer 536 is a parametric rectified linear unit (PReLU) activation function, layer 536 is a 3×3 2D convolution with 16 input channels and 16 output channels, and layer 540 is another PReLU activation function.

Secondary context encoder 504 also includes four layers 544, 546, 548, and 550. Layer 544 is a 3×3 two-dimensional (2D) convolution with seven input channels and 16 output channels, layer 536 is a parametric rectified linear unit (PReLU) activation function, layer 536 is a 3×3 2D convolution with 16 input channels and 16 output channels, and layer 540 is another PReLU activation function. Differences in the numbers of input channels for layers 534 and 544 may reflect differences in the numbers of primary features 506 and 508 and secondary features 508 inputted into primary context encoder 502 and secondary context encoder 504, respectively.

Figure 5B:
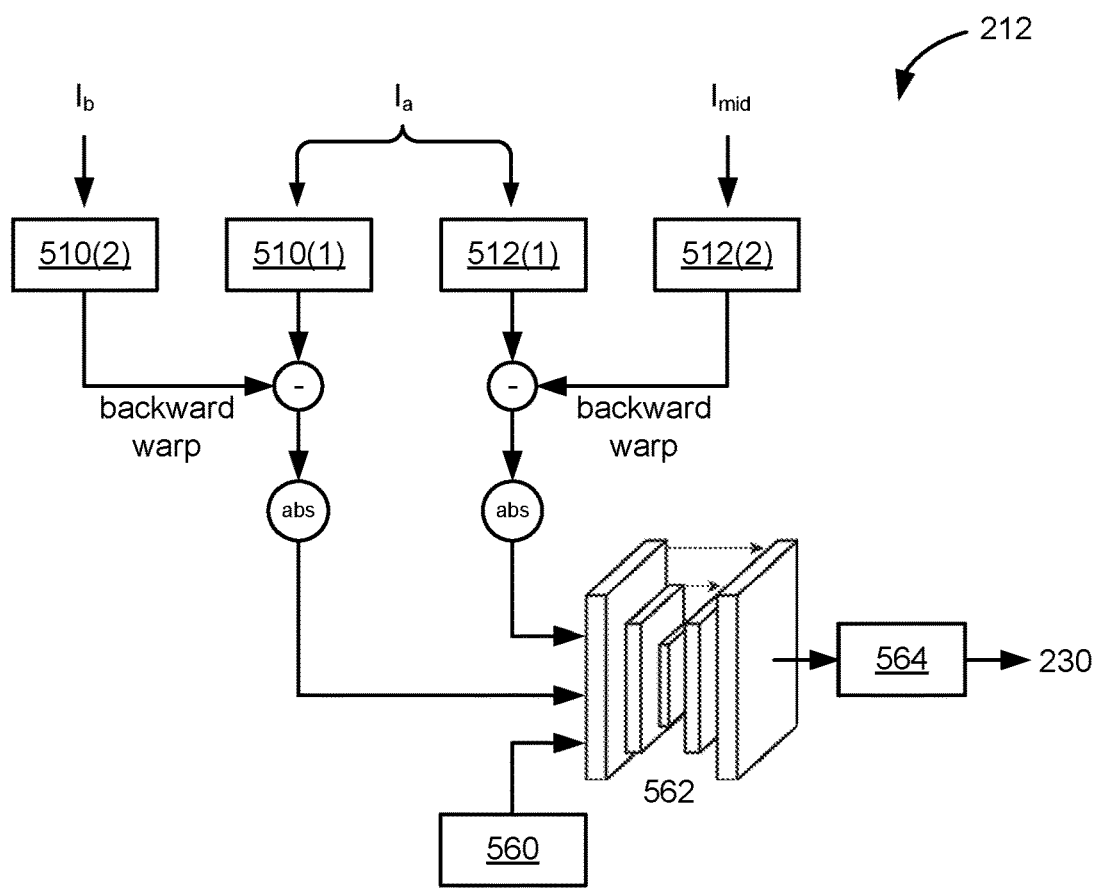
FIG. 5B is an example architecture associated with the weighting network of FIG. 2, according to various embodiments.

FIG. 5B is an example architecture associated with weighting network 212 of FIG. 2, according to various embodiments. As shown in FIG. 5B, initial input associated with weighting network 212 includes a first feature map 510(1) generated by primary context encoder 502 from primary features for a first key frame $I_a$ that precedes a target frame $I_{mid}$, a second feature map 512(1) generated by secondary context encoder 504 from secondary features for the first key frame, a third feature map 510(2) generated by primary context encoder 502 from primary features for a second key frame $I_b$ that succeeds the target frame, and a fourth feature map 512(2) generated by secondary context encoder 504 from secondary features for the target frame.

Feature map 510(2) associated with $I_b$ is backward warped onto the time step associated with $I_a$, and feature map 512(2) associated with $I_{mid}$ is backward warped onto the same time step. This backward warping may be performed using one or more flows generated by flow estimation network 208 and/or another component. An absolute value of the difference between the backward-warped feature map 510(2) and the corresponding feature map 510(1) is calculated, and an absolute value of the difference between the backward-warped feature map 512(2) and the corresponding feature map 512(1) is also calculated.

These absolute values are inputted into a neural network 562, along with additional input 560 related to the key frames and/or target frame. Neural network 562 then uses the inputs to generate output representing weights 230, and a mapping 564 is applied to convert the output into weights 230. For example, additional input 560 may include a feature map and/or another representation of primary features for $I_a$, a forward flow from $I_a$ to $I_b$, and/or a backward warp mask associated with backward warping of $I_b$ onto $I_a$ and/or backward warping of $I_{mid}$ onto $I_a$. Neural network 562 may include a three-level UNet with skip connections that generates output ranging from negative infinity to positive infinity. To convert this output into a range between 0 and 1, the following mapping 564 may be applied to the output x to generate weights 230:

$$f(x)=\max(0,x)+\min(1,e^x)=ELU(x)+1 \qquad (2)$$

Figure 6:
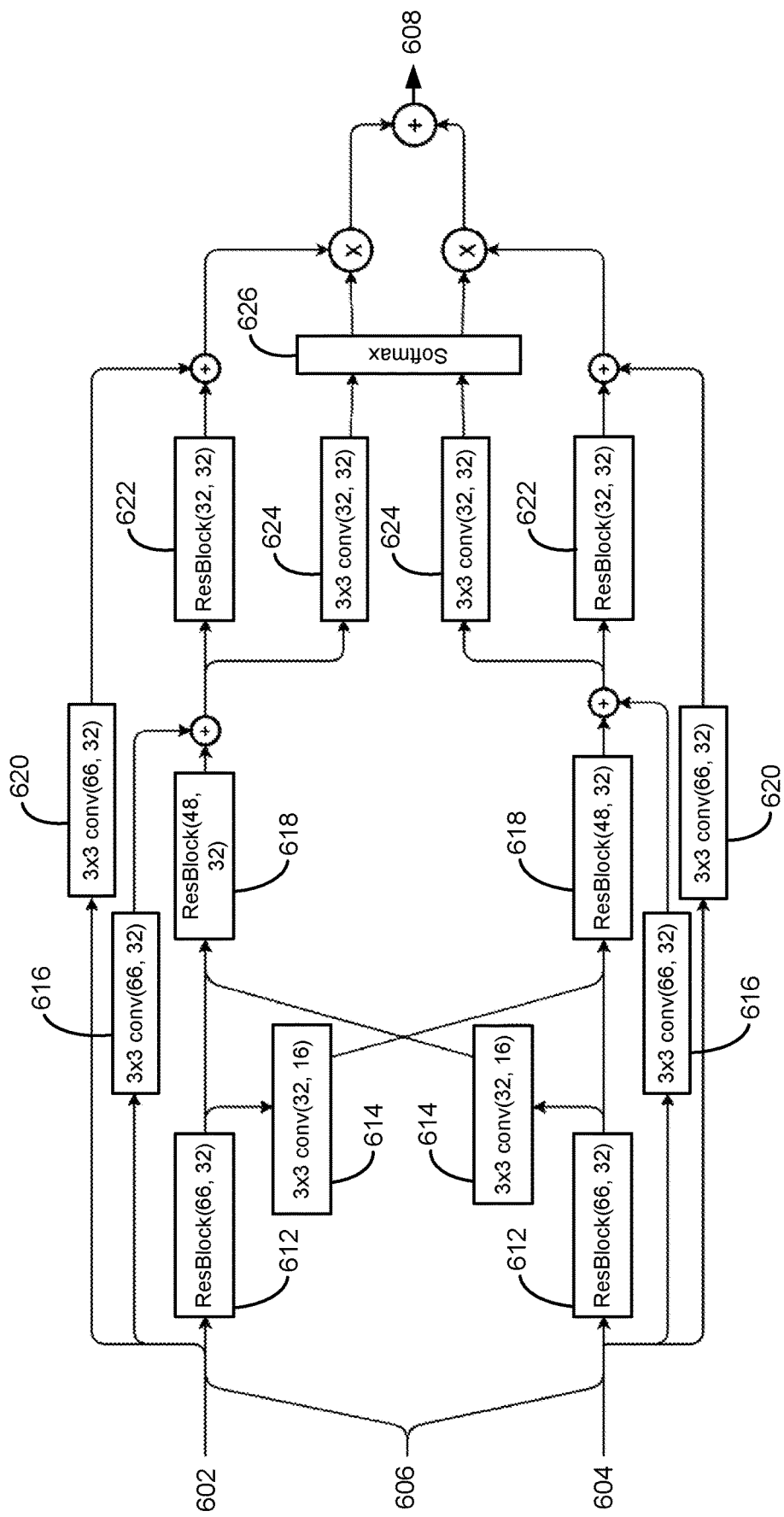
FIG. 6 is an example architecture for a preprocessing network associated with the synthesis network of FIG. 2, according to various embodiments.

FIG. 6 is an example architecture for a preprocessing network associated with synthesis network 214 of FIG. 2, according to various embodiments. More specifically, FIG. 6 illustrates a network that merges features 602 for a first key frame, features 604 for a second key frame, and features 606 for a target frame into a representation 608 that is then inputted into synthesis network 214.

In one or more embodiments, features 602 for the first key frame include warped feature maps and weights 230 for the first key frame, and features 604 for the second key frame include warped feature maps and weights 230 for the second key frame. Features 606 for the target frame include unwarped feature maps for the target frame.

As shown in FIG. 6, the preprocessing network includes a number of components 612, 614, 616, 618, 620, 622, and 624 that are duplicated in the preprocessing network. Duplication of a given component in FIG. 6 indicates that the same set of weights is used at each location in which the component appears. Components 612, 618, and 622 include residual blocks, and components 614, 616, 620, and 624 include 3×3 convolutions. Two numerical values following "3×3 cony" or "ResBlock" in each component specify the number of input channels and output channels for the component.

The preprocessing network additionally includes a layer 626 that applies a softmax activation function to two outputs generated by two instances of component 624. Each of two outputs of layer 626 is used to scale the sum of the output of a corresponding instance of component 620 and a corresponding instance of component 622. Two copies of scaled output generated by combining the outputs of layer 626, component 620, and component 622 are then summed to produce representation 608.

Figure 7:
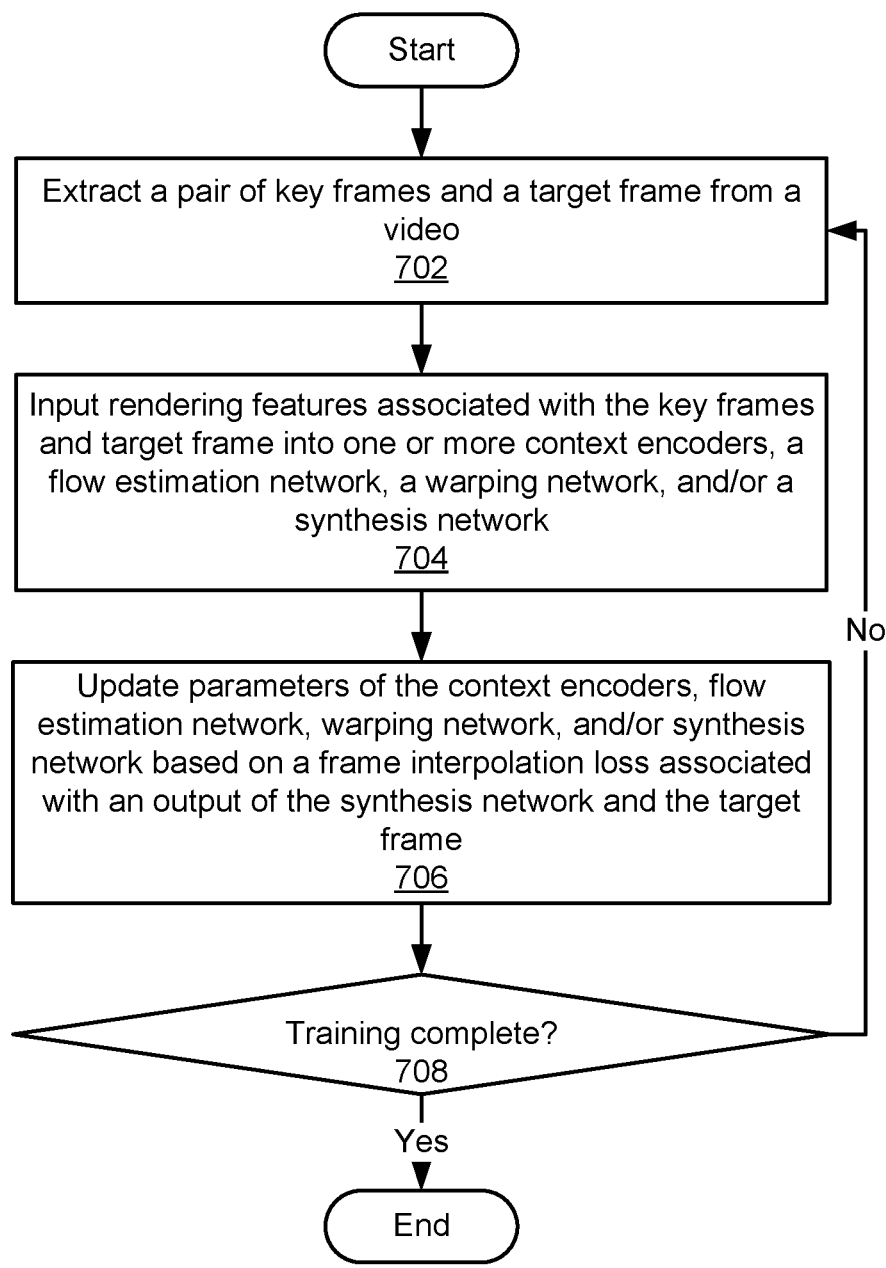
FIG. 7 is a flow diagram of method steps for training a deep learning model to perform frame interpolation, according to various embodiments.

FIG. 7 is a flow diagram of method steps for training a deep learning model to perform frame interpolation, according to various embodiments. Although the method steps are described in conjunction with the systems of FIGS. 1-6, persons skilled in the art will understand that any system configured to perform the method steps in any order falls within the scope of the present disclosure.

As shown, in operation 702, training engine 122 extracts a pair of key frames and a target frame from a video. For example, training engine 122 may extract three consecutive frames from the same sequence of video. The first and last frames may be key frames, and the second frame may be a ground truth frame for a target frame to be interpolated using the key frames.

Next, in operation 704, training engine 122 inputs rendering features associated with the key frames and target frame into one or more context encoders, a flow estimation network, a warping module, and/or a synthesis network. For example, the rendering features may include primary features associated with the key frames and secondary features associated with the key frames and the target frame. The secondary features may include an albedo, a surface normal vector, a depth, a motion vector, an alpha channel, an object identifier, a texture coordinate. The primary features may include the secondary features and additional features that are not available until a corresponding frame is rendered, such as color values, per-light outputs, and/or light-path-dependent decompositions.

In operation 706, training engine 122 updates parameters of the context encoders, flow estimation network, warping module, and/or synthesis network based on a frame interpolation loss associated with an output of the synthesis network and the target frame. For example, training engine 122 may calculate the frame interpolation loss based on a difference between the output of the synthesis network and the target frame. Training engine 122 may then use gradient descent and backpropagation to update parameters of the context encoders, flow estimation network, warping module, and/or synthesis network in a way that reduces the frame interpolation loss. Alternatively, training engine 122 and/or another component may train the flow estimation network separately (e.g., in a supervised manner using ground truth motion vectors and a different loss function) and use the frame interpolation loss to update the parameters of the context encoders, warping module, and/or synthesis network.

After operations 702, 704, and 706 are complete, training engine 122 performs operation 708, in which training engine 122 evaluates a condition indicating whether or not training of the deep learning model is complete. For example, the condition may include, but is not limited to, convergence in parameters of the deep learning model, the lowering of the frame interpolation loss to below a threshold, and/or the execution of a certain number of training steps, iterations, batches, and/or epochs. If the condition is not met, training engine 122 may continue extracting key frames and an associated target frame from the same video or a different video (operation 702), inputting rendering features associated with the key frames and target frame into some or all components of the deep learning model (operation 704), and updating parameters of the component(s) based on the frame interpolation loss (operation 706). If the condition is met, training engine 122 ends the process of training the deep learning model.

Figure 8:
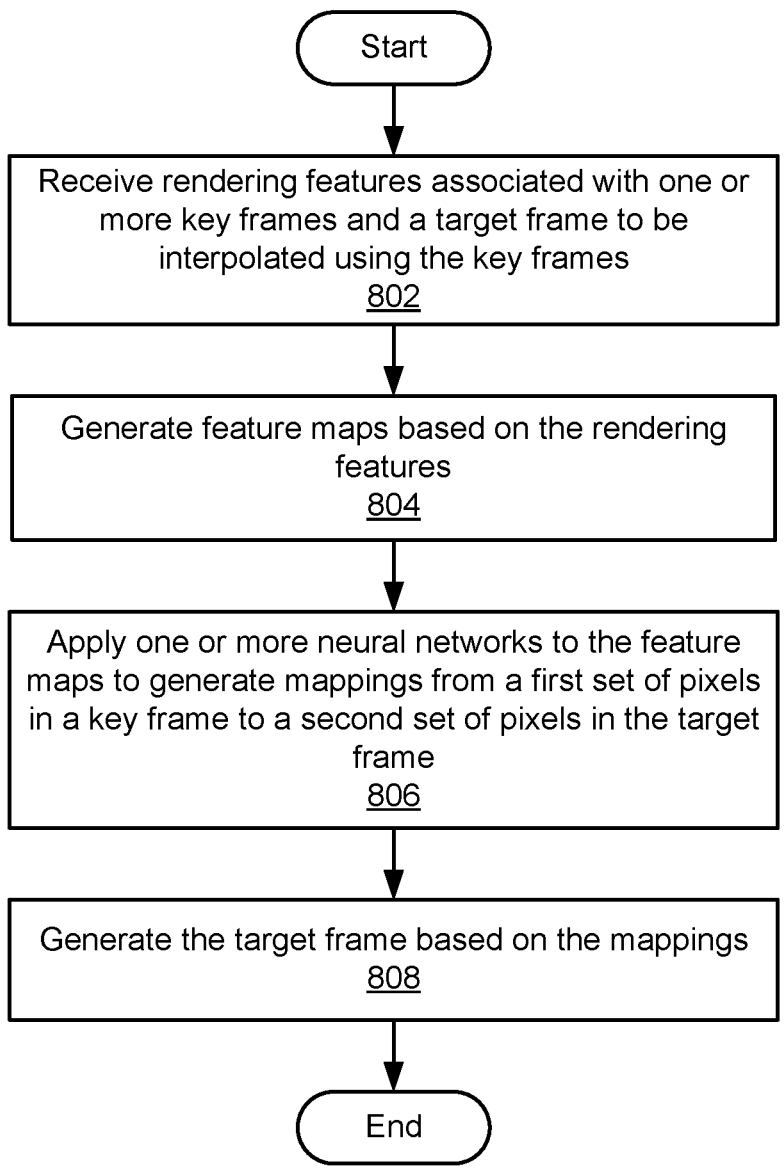
FIG. 8 is a flow diagram of method steps for performing frame interpolation, according to various embodiments.

FIG. 8 is a flow diagram of method steps for performing frame interpolation, according to various embodiments. Although the method steps are described in conjunction with the systems of FIGS. 1-6, persons skilled in the art will understand that any system configured to perform the method steps in any order falls within the scope of the present disclosure.

As shown in FIG. 8, in operation 802, estimation engine 124 receives rendering features associated with one or more key frames and a target frame to be interpolated using the key frames. The rendering features may include attributes that are used to render each of the key frames and the target frame.

Next, in operation 804, estimation engine 124 generates feature maps based on the rendering features. For example, estimation engine 124 may input a set of primary rendering features associated with each key frame into one or more primary context encoders to generate one or more corresponding feature pyramids. Estimation engine 124 may also input a set of secondary rendering features associated with each of the key frame(s) and the target frame into one or more secondary context encoders to generate one or more corresponding feature pyramids. Each feature pyramid may include multiple feature maps at different scales or resolutions.

In operation 806, estimation engine 124 applies one or more neural networks to the feature maps to generate mappings from a first set of pixels in a key frame to a second set of pixels in the target frame. For example, estimation engine 124 may input feature maps generated in operation 804 into a flow estimation network to generate motion vectors representing estimated optical flow associated with the key frame(s) and target frame. Each motion vector includes a mapping from a pixel location in a key frame to a corresponding pixel location in the target frame.

Finally, in operation 808, estimation engine 124 generates the target frame based on the mappings. Continuing with the above example, estimation engine 124 may input the motion vectors and the same feature maps or different feature maps into a weighting network to generate weights that represent relative importances of pixels in a key frame that are mapped to the same location in the target frame. Estimation engine 124 may also input the motion vectors, the same feature maps or different feature maps, and/or weights produced by the weighting network into a warping module to warp feature maps associated with one or more key frames onto the target frame. Estimation engine 124 may then input the warped feature maps and/or one or more unwarped feature maps associated with the target frame into a preprocessing network and/or a synthesis network to produce an estimate of the target frame.

In sum, the disclosed techniques utilize feature maps generated from attributes that are used to render video content to interpolate a target frame based on one or more key frames. The feature maps are generated by a number of context encoders from primary features for the key frame(s) and secondary features for the key frame(s) and the target frame. The secondary features include some or all features that are available for the target frame, and the primary features include some or all secondary features and one or more additional features that are available after a frame is rendered.

The feature maps are included as input into one or more components of a deep learning model. The components include a flow estimation network that generates motion vectors representing optical flow between two key frames and/or between a key frame and the target frame. The components also, or instead, include a weighting network that calculates weights representing the relative importances of pixels in a key frame with motion vectors that map to the same pixel location in the target frame. The components also, or instead, include a warping module that uses the motion vectors and weights to warp feature maps associated with each key frame onto the target frame. The components also, or instead, include a synthesis network that generates the target frame based on the warped feature maps and unwarped feature maps associated with the target frame.

One technical advantage of the disclosed techniques relative to the prior art is a reduction in computational overhead associated with rendering frames in computer-generated video content. In this regard, the disclosed techniques can be used to efficiently interpolate a subset of frames in the computer-generated video content from a different subset of rendered frames instead of rendering all frames in the computer-generated video content. Another technical advantage is a more detailed, sharp, or accurate interpolated target frame than interpolated frames generated by existing approaches. A third technical advantage is accurate estimation of nonlinear motion between or across frames in the computer-generated video content, unlike conventional approaches that assume linear motion between key frames. These technical advantages provide one or more technological improvements over prior art approaches.

1. In some embodiments, a computer-implemented method for performing frame interpolation comprises generating (i) a first set of feature maps based on a first set of rendering features associated with a first key frame, (ii) a second set of feature maps based on a second set of rendering features associated with a second key frame, and (iii) a third set of feature maps based on a third set of rendering features associated with a target frame to be interpolated based on the first key frame and the second key frame, applying one or more neural networks to the first set of feature maps, the second set of feature maps, and the third set of feature maps to generate a set of mappings from a first set of pixels in the first key frame to a second set of pixels in the target frame, and generating the target frame based on the set of mappings.

2. The computer-implemented method of clause 1, further comprising training the one or more neural networks based on a frame interpolation loss associated with the target frame and a ground truth frame.

3. The computer-implemented method of clauses 1 or 2, wherein training the one or more neural networks comprises applying the frame interpolation loss at a plurality of resolutions associated with at least one of the first set of feature maps, the second set of feature maps, or the third set of feature maps.

4. The computer-implemented method of any of clauses 1-3, wherein each of the first set of feature maps, the second set of feature maps, and the third set of feature maps is generated by generating a first feature map at a first resolution, and generating a second feature map at a second resolution that is higher than the first resolution.

5. The computer-implemented method of any of clauses 1-4, wherein generating the first set of feature maps, the second set of feature maps, and the third set of feature maps comprises applying a first context encoder to the first set of rendering features to generate a first subset of feature maps included in the first set of feature maps, applying the first context encoder to the second set of rendering features to generate a second subset of feature maps included in the second set of feature maps, and applying a second context encoder to the third set of rendering features to generate the third set of feature maps.

6. The computer-implemented method of any of clauses 1-5, wherein generating the first set of feature maps, the second set of feature maps, and the third set of feature maps further comprises applying the second context encoder to a first subset of rendering features included in the first set of rendering features to generate a third subset of feature maps included in the first set of feature maps, and applying the second context encoder to a second subset of rendering features included in the second set of rendering features to generate a fourth subset of feature maps included in the second set of feature maps.

7. The computer-implemented method of any of clauses 1-6, wherein applying the one or more neural networks to the first set of feature maps, the second set of feature maps, and the third set of feature maps comprises generating a first cost volume associated with the third set of feature maps and at least one of the first set of feature maps and the second set of feature maps, and estimating an optical flow between the target frame and at least one of the first key frame or the second key frame based on the first cost volume, the first set of feature maps, the second set of feature maps, and the third set of feature maps.

8. The computer-implemented method of any of clauses 1-7, wherein applying the one or more neural networks to the first set of feature maps, the second set of feature maps, and the third set of feature maps further comprises estimating the optical flow based on a second cost volume associated with the first set of feature maps and the second set of feature maps.

9. The computer-implemented method of any of clauses 1-8, wherein applying the one or more neural networks to the first set of feature maps, the second set of feature maps, and the third set of feature maps comprises generating a set of weights representing relative importances of a subset of pixels included in the first set of pixels to a pixel location in the target frame to which the subset of pixels is mapped.

10. The computer-implemented method of any of clauses 1-9, wherein generating the target frame comprises generating a first set of warped feature maps based on the first set of feature maps and the set of mappings, and applying a synthesis network to the first set of warped feature maps and the third set of feature maps to produce the target frame.

11. The computer-implemented method of any of clauses 1-10, wherein the first set of rendering features or the second set of rendering features comprises at least one of a color, an albedo, a surface normal vector, a depth, a motion vector, an alpha channel, an object identifier, a texture coordinate, a per-light output, or a light-path-dependent decomposition.

12. The computer-implemented method of any of clauses 1-11, wherein the third set of rendering features comprises at least one of an albedo, a surface normal vector, a depth, a motion vector, an alpha channel, an object identifier, or a texture coordinate.

13. In some embodiments, one or more non-transitory computer readable media store instructions that, when executed by one or more processors, cause the one or more processors to perform the steps of generating (i) a first set of feature maps based on a first set of rendering features associated with a first key frame, (ii) a second set of feature maps based on a second set of rendering features associated with a second key frame, and (iii) a third set of feature maps based on a third set of rendering features associated with a target frame to be interpolated based on the first key frame and the second key frame, applying one or more neural networks to the first set of feature maps, the second set of feature maps, and the third set of feature maps to generate a set of mappings from a first set of pixels in the first key frame to a second set of pixels in the target frame, and generating the target frame based on the set of mappings.

14. The one or more non-transitory computer readable media of clause 13, wherein generating the first set of feature maps, the second set of feature maps, and the third set of feature maps comprises applying a first context encoder to the first set of rendering features to generate a first subset of feature maps included in the first set of feature maps, applying the first context encoder to the second set of rendering features to generate the second set of feature maps, applying a second context encoder to the third set of rendering features to generate the third set of feature maps, and applying the second context encoder to a first subset of rendering features included in the first set of rendering features to generate a second subset of feature maps included in the first set of feature maps.

15. The one or more non-transitory computer readable media of clauses 13 or 14, wherein the first context encoder or the second context encoder comprise a two-dimensional convolution associated with a parametric rectified linear unit activation function.

16. The one or more non-transitory computer readable media of any of clauses 13-15, wherein applying the one or more neural networks to the first set of feature maps, the second set of feature maps, and the third set of feature maps comprises generating a first cost volume associated with the third set of feature maps and at least one of the first set of feature maps or the second set of feature maps, generating a second cost volume associated with the first set of feature maps and the second set of feature maps, and estimating an optical flow between the target frame and at least one of the first key frame or the second key frame based on the first cost volume, the second cost volume, the first set of feature maps, the second set of feature maps, and the third set of feature maps.

17. The one or more non-transitory computer readable media of any of clauses 13-16, wherein applying the one or more neural networks to the first set of feature maps, the second set of feature maps, and the third set of feature maps comprises generating one or more combinations of the first set of feature maps, the second set of feature maps, and the third set of feature maps based on one or more backward warping operations, and generating a set of weights representing relative importances of a subset of pixels included in the first set of pixels to a pixel location in the target frame to which the subset of pixels is mapped based on the one or more combinations.

18. The one or more non-transitory computer readable media of any of clauses 13-17, wherein generating the target frame comprises applying the set of mappings and the set of weights to the first set of feature maps to generate a first set of warped feature maps, inputting the first set of warped feature maps and the third set of feature maps into a preprocessing network to produce a merged representation associated with the first set of feature maps and the third set of feature maps, and applying a synthesis network to the merged representation to produce the target frame.

19. The one or more non-transitory computer readable media of any of clauses 13-18, wherein generating the target frame comprises generating a first set of warped feature maps based on the first set of feature maps and the set of mappings, generating a second set of warped feature maps based on the second set of feature maps and an additional set of mappings from a third set of pixels in the second key frame to the second set of pixels in the target frame, and generating the target frame based on the first set of warped feature maps, the second set of warped feature maps, and the third set of feature maps to produce the target frame.

20. In some embodiments, a system comprises a memory that stores instructions, and a processor that is coupled to the memory and, when executing the instructions, is configured to generating (i) a first set of feature maps based on a first set of rendering features associated with a first key frame, (ii) a second set of feature maps based on a second set of rendering features associated with a second key frame, and (iii) a third set of feature maps based on a third set of rendering features associated with a target frame to be interpolated based on the first key frame and the second key frame, applying one or more neural networks to the first set of feature maps, the second set of feature maps, and the third set of feature maps to generate a set of mappings from a first set of pixels in the first key frame to a second set of pixels in the target frame, and generating the target frame based on the set of mappings.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing frame interpolation, the method comprising:
   converting a first set of rendering features used to render a first key frame from one or more models of one or more objects in the first key frame into a first set of feature maps;
   converting a second set of rendering features of a target frame into a second set of feature maps, wherein the target frame is to be rendered based on at least the first key frame, wherein the second set of rendering features comprises features of the target frame that are available prior to the target frame being rendered and that are independent of features associated with key frames that have been rendered, and wherein the second set of rendering features is associated with one or more additional models of one or more additional objects to be rendered in the target frame that are different from the one or more objects in the first key frame;

applying one or more neural networks to the first set of feature maps and the second set of feature maps to generate a set of mappings from a first set of pixels in the first key frame to a second set of pixels in the target frame; and generating the target frame based on the set of mappings.

2. The computer-implemented method of claim 1, further comprising training the one or more neural networks based on a frame interpolation loss associated with the target frame and a ground truth frame.

3. The computer-implemented method of claim 2, wherein training the one or more neural networks comprises applying the frame interpolation loss at a plurality of resolutions associated with at least one of the first set of feature maps or the second set of feature maps.

4. The computer-implemented method of claim 1, wherein converting the first set of rendering features into the first set of feature maps comprises:

generating a first feature map at a first resolution; and
generating a second feature map at a second resolution that is higher than the first resolution.

5. The computer-implemented method of claim 1, wherein converting the first set of rendering features comprises applying a first context encoder to the first set of rendering features to generate a first subset of feature maps included in the first set of feature maps, and wherein converting the second set of rendering features comprises applying a second context encoder to the second set of rendering features to generate the second set of feature maps.

6. The computer-implemented method of claim 5, further comprising applying the second context encoder to a first subset of rendering features included in the first set of rendering features to generate a second subset of feature maps included in the first set of feature maps.

7. The computer-implemented method of claim 1, wherein applying the one or more neural networks to the first set of feature maps and the second set of feature maps comprises:

generating a first cost volume associated with the second set of feature maps and the first set of feature maps; and
estimating an optical flow between the target frame and the first key frame based on the first cost volume.

8. The computer-implemented method of claim 7, wherein applying the one or more neural networks to the first set of feature maps and the second set of feature maps further comprises estimating the optical flow based on a second cost volume associated with the first set of feature maps and a third set of feature maps associated with a second key frame.

9. The computer-implemented method of claim 1, wherein applying the one or more neural networks to the first set of feature maps and the second set of feature maps comprises generating a set of weights representing relative importances of a subset of pixels included in the first set of pixels to a pixel location in the target frame to which the subset of pixels is mapped.

10. The computer-implemented method of claim 1, wherein generating the target frame comprises:

generating a first set of warped feature maps based on the first set of feature maps and the set of mappings; and
applying a synthesis network to the first set of warped feature maps and the second set of feature maps to generate the target frame.

11. The computer-implemented method of claim 1, wherein the first set of rendering features comprises at least one of an albedo, a surface normal vector, a depth, an alpha channel, an object identifier, a texture coordinate, a per-light output, or a light-path-dependent decomposition.

12. The computer-implemented method of claim 1, wherein the second set of rendering features comprises at least one of an albedo, a surface normal vector, a depth, an alpha channel, an object identifier, or a texture coordinate.

13. One or more non-transitory computer readable media storing instructions that, when executed by one or more processors, cause the one or more processors to perform the steps of:

converting a first set of rendering features used to render a first key frame from one or more models of one or more objects in the first key frame into a first set of feature maps;
converting a second set of rendering features of a target frame into a second set of feature maps, wherein the target frame is to be rendered based on at least the first key frame, wherein the second set of rendering features comprises features of the target frame that are available prior to the target frame being rendered and that are independent of features associated with key frames that have been rendered, and wherein the second set of rendering features is associated with one or more additional models of one or more additional objects to be rendered in the target frame that are different from the one or more objects in the first key frame;
applying one or more neural networks to the first set of feature maps and the second set of feature maps to generate a set of mappings from a first set of pixels in the first key frame to a second set of pixels in the target frame; and
generating the target frame based on the set of mappings.

14. The one or more non-transitory computer readable media of claim 13, wherein the instructions further cause the one or more processors to perform the steps of:

applying a first context encoder to the first set of rendering features to generate a first subset of feature maps included in the first set of feature maps;
applying a second context encoder to the second set of rendering features to generate the second set of feature maps; and
applying the second context encoder to a first subset of rendering features included in the first set of rendering features to generate a second subset of feature maps included in the first set of feature maps.

15. The one or more non-transitory computer readable media of claim 14, wherein the first context encoder or the second context encoder comprise a two-dimensional convolution associated with a parametric rectified linear unit activation function.

16. The one or more non-transitory computer readable media of claim 13, wherein applying the one or more neural networks to the first set of feature maps and the second set of feature maps comprises:

generating a first cost volume associated with the second set of feature maps and the first set of feature maps;
generating a second cost volume associated with the first set of feature maps and a third set of feature maps associated with a second key frame; and
estimating an optical flow between the target frame and at least one of the first key frame or the second key frame based on the first cost volume, the second cost volume, the first set of feature maps, the second set of feature maps, and the third set of feature maps.

17. The one or more non-transitory computer readable media of claim 13, wherein applying the one or more neural networks to the first set of feature maps and the second set of feature maps comprises:
generating one or more combinations of the first set of feature maps and the second set of feature maps based on one or more backward warping operations; and
generating a set of weights representing relative importances of a subset of pixels included in the first set of pixels to a pixel location in the target frame to which the subset of pixels is mapped based on the one or more combinations.

18. The one or more non-transitory computer readable media of claim 17, wherein generating the target frame comprises:
applying the set of mappings and the set of weights to the first set of feature maps to generate a first set of warped feature maps;
inputting the first set of warped feature maps and the second set of feature maps into a preprocessing network to produce a merged representation associated with the first set of feature maps and the second set of feature maps; and
applying a synthesis network to the merged representation to generate the target frame.

19. The one or more non-transitory computer readable media of claim 13, wherein generating the target frame comprises:
generating a first set of warped feature maps based on the first set of feature maps and the set of mappings;
generating a second set of warped feature maps based on a third set of feature maps associated with a second key frame and an additional set of mappings from a third set of pixels in the second key frame to the second set of pixels in the target frame; and
generating the target frame based on the first set of warped feature maps and the second set of warped feature maps.

20. A system, comprising:
a memory that stores instructions, and
a processor that is coupled to the memory and, when executing the instructions, is configured to perform the steps of:
converting a first set of rendering features used to render a first key frame from one or more models of one or more objects in the first key frame into a first set of feature maps;
converting a second set of rendering features of a target frame into a second set of feature maps, wherein the target frame is to be rendered based on at least the first key frame, wherein the second set of rendering features comprises features of the target frame that are available prior to the target frame being rendered and that are independent of features associated with key frames that have been rendered, and wherein the second set of rendering features is associated with one or more additional models of one or more additional objects to be rendered in the target frame that are different from the one or more objects in the first key frame;
applying one or more neural networks to the first set of feature maps and the second set of feature maps to generate a set of mappings from a first set of pixels in the first key frame to a second set of pixels in the target frame; and
generating the target frame based on the set of mappings.

* * * * *